(12) United States Patent
Sivakumar

(10) Patent No.: US 7,085,568 B2
(45) Date of Patent: Aug. 1, 2006

(54) PROVISION OF LOCAL DATA IN A WIRELESS SYSTEM

(75) Inventor: Tatikonda Venkata Lakshmi Narasinh Sivakumar, Tokyo (JP)

(73) Assignee: Nokia Corporation, Espoo (FI)

( * ) Notice: Subject to any disclaimer, the term of this patent is extended or adjusted under 35 U.S.C. 154(b) by 602 days.

(21) Appl. No.: 09/894,382

(22) Filed: Jun. 28, 2001

(65) Prior Publication Data

US 2002/0049056 A1    Apr. 25, 2002

(30) Foreign Application Priority Data

Jun. 30, 2000    (GB) .............................. 0016194.3

(51) Int. Cl.
*H04Q 7/20*    (2006.01)
(52) U.S. Cl. ............................ 455/435.1; 455/414.1; 455/414.2; 455/456.1; 455/466; 455/435.2; 455/435.3; 370/328; 370/338
(58) Field of Classification Search .............. 455/66.1, 455/412.2, 414.1, 435.1, 435.2, 435.3, 456.1, 455/456.3, 456.5, 456.6, 457, 466; 340/539.13, 340/994; 370/328, 338; 701/207, 211, 213; 705/26, 27
See application file for complete search history.

(56) References Cited

U.S. PATENT DOCUMENTS

| | | | | |
|---|---|---|---|---|
| 4,777,474 A | * | 10/1988 | Clayton | 340/539.11 |
| 5,732,326 A | * | 3/1998 | Maruyama et al. | 455/66.1 |
| 5,991,749 A | * | 11/1999 | Morrill, Jr. | 705/44 |
| 6,219,696 B1 | * | 4/2001 | Wynblatt et al. | 709/218 |
| 6,263,316 B1 | * | 7/2001 | Khan et al. | 705/13 |
| 6,587,835 B1 | * | 7/2003 | Treyz et al. | 705/14 |
| 6,714,797 B1 | * | 3/2004 | Rautila | 455/552.1 |

FOREIGN PATENT DOCUMENTS

| | | | |
|---|---|---|---|
| EP | 0338997 A2 | | 10/1989 |
| EP | 0583214 A1 | | 2/1994 |
| GB | 2309523 | | 7/1997 |
| GB | 2352588 | | 1/2001 |
| GB | 2357404 | | 6/2001 |
| JP | 11250393 | | 9/1999 |
| JP | 11252121 | | 9/1999 |
| WO | WO9407225 | * | 3/1994 |
| WO | WO 97/17681 | | 5/1997 |
| WO | WO 98/00819 | | 1/1998 |

OTHER PUBLICATIONS

Khuen, Chan Wei and Pang Kang Ming; "Pager With Selective Alert Signals"; Sep. 1998; p. 95; Motorola, Inc.

* cited by examiner

*Primary Examiner*—Steve M. D'Agosta
(74) *Attorney, Agent, or Firm*—Banner & Witcoff, LTD

(57) ABSTRACT

A local data provision system comprising: a plurality of transmitters each located at a respective entity having a limited range of physical utility, and each transmitter being arranged repeatedly or on demand to transmit wirelessly a signal carrying data indicating the presence of the respective entity over a range substantially coterminous with the range of utility of that entity; and a personal information unit comprising a user interface for signaling information to a user and a receiver arranged to receive the availability data and to cause the user interface to signal information to the user in dependence on the received availability data.

7 Claims, 2 Drawing Sheets

PROVISION OF LOCAL DATA IN A WIRELESS SYSTEM

This invention relates to a system for providing a user with information on local circumstances. The system may make use of a wireless data transfer medium such as radio frequency (RF) signaling—preferably low-power RF—or other means such as infra-red signaling to transfer data between a personal device that could be carried by a user and a static device that transmits data relating to the local circumstances.

BACKGROUND OF THE INVENTION

In many situations it would be useful for people to receive wirelessly information on local circumstances. For example, if a person wishes to buy from a vending machine it would be useful for him to be informed when he passes near a suitable vending machine, or if a blind person moves to an area of danger it would be useful for him to receive a warning.

Many facilities and dangers are already signed by visible, audible or tactile means. For example, shops and vending machines often bear advertising signs, pedestrian crossings may have warning buzzers and dangers such as the edges of station platforms may be marked by raised flooring. However, these are all suitable only for limited communication even to people within the normal range of utility of the circumstance being signed. For example, a vending machine may be obscured so that it cannot be seen even if it is close by and convenient for use, warning buzzers may be drowned out by loud background noises, and tactile markings are inconvenient to install and offer very limited information.

Directory and map systems exist, by means of which it is possible for a person to determine the location of facilities or dangers in a certain location. However, in order for these systems to be useful a user must know where he will be at a given time, and what his requirements will be then.

There is therefore a need for an improved system for providing information on local circumstances, especially for handicapped people.

SUMMARY OF THE INVENTION

According to the present invention there is provided a local data provision system comprising: a plurality of transmitters each located at a respective entity having a limited range of physical utility, and each transmitter being arranged repeatedly or on demand to transmit wirelessly a signal carrying data indicating the presence of the respective entity over a range substantially coterminous with the range of utility of that entity; and a personal information unit comprising a user interface for signaling information to a user and a receiver arranged to receive the availability data and the cause the user interface to signal information to the user in dependence on the received availability data.

Preferably the signal is a radio signal, for example a low power RF signal. The signal may employ a low power RF technology such as Bluetooth.

There may be a status sensor located at at least one of the entities and capable of sensing the status of the entity and causing the respective transmitter to transmit wirelessly a signal carrying data indicating the status of the respective entity.

The data indicating the presence of the respective entity is suitably termed availability data.

The signal carrying data indicating the presence of a respective entity includes data indicating the nature or type of the entity, for example as a numeric code embedded in the signal. Preferably the personal information unit is arranged to cause the user interface to signal to the user the nature or type of the entity received in the availability data.

Preferably some or all of the transmitters are static. Preferably the personal information unit is mobile.

The personal information unit suitably includes a memory capable of storing a plurality of entity types and the personal information unit is arranged to cause the user interface to signal information to the user only if the received availability data includes data indicating one of the stored types. Preferably, the personal information unit includes input means such as a keypad for allowing a user to specify the plurality of entity types that are to be stored.

The personal information unit may be a cellular telephone, providing cellular telephone functionality in addition to that described above. Alternatively, or in addition, it may provide other functionality such as audio replay functionality.

The personal information unit is capable of non-visually alerting a user in dependence on the received availability data, for example by means of a buzzer or a vibrating device. The personal information unit may be capable of alerting a user with one of a plurality of alerts in dependence on the type indicated by received availability data.

The personal information unit is suitably a portable unit.

BRIEF DESCRIPTION OF THE DRAWINGS

The present invention will now be described by way of example with reference to the accompanying drawings, in which.

DETAILED DESCRIPTION

Figure 1:
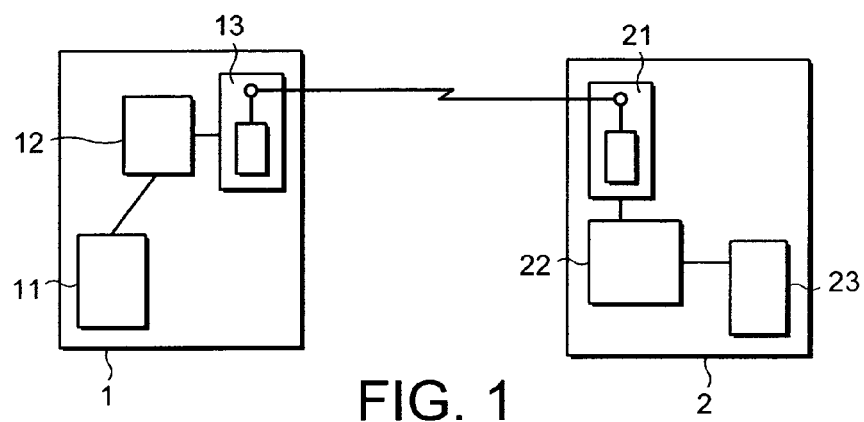
FIG. 1 shows a schematic diagram of a local information provision system.

The system of FIG. 1 comprises two principal components: an information provision unit 1, and a portable information receiver 2. The information provision unit is primarily intended to be fixed in location at the site of the circumstance on which it is to provide information. However, if that circumstance is movable then the information provision unit could move with it. The portable information receiver is intended to be carried by a user so that the user can be provided with information from nearby information provision units. The transmission range of the information provision unit may be limited, or there may be means for the information receiver to determine its distance from an information provision unit. The portable information receiver may allow a user to select the types of information he needs. By this means the user may be informed of local circumstances that are relevant to his needs.

The information provision unit 1 comprises a status sensor 11, a central processing unit 12 and a transmitter unit 13. The components 11 to 13 may, for example, be powered by a battery in the information provision unit, a connection to mains power or a solar cell.

In operation the status sensor senses at least one local factor—for example, if the information provision unit is at a pedestrian crossing it may sense whether the pedestrian crossing is currently permitting pedestrians to cross a road. Data representing the information sensed by the sensor is passed to the central processor which causes the transmitter unit 13 to transmit a corresponding signal for reception by nearby portable information receivers.

If the information provision unit is to transmit a signal that is dependant on constant rather than changeable local circumstances then the status sensor may be omitted. For example, if the information provision unit is to provide warning of the proximity of a station platform edge then the central processing unit can cause the transmitter unit to transmit an unchanging signal. In other situations the status sensor may be arranged to sense an array of local factors, for example if the information provision unit is at a vending machine then it may be arranged to sense whether the vending machine has certain products in stock. The central processing unit can then cause the transmitter unit to transmit a signal that indicates this data.

The central processing unit may be provided with a temporary random access memory and a non-volatile program memory in the normal way.

The transmitter unit may transmit signals using any suitable physical means and protocol. Examples of suitable physical means are radio and infra-red. Of these radio is preferred since it does not require line-of-sight correlation of transmitter and receiver. Low-power RF technologies such as Bluetooth are especially preferred for carrying the data. The transmitter includes dedicated circuitry for generating the signals that are to be transmitted, based on signals received from the processing unit 12, and transmission hardware such as a light-emitting diode for infra-red or a transmit chain and an antenna for RF.

If wireless data is to be received by the information provision unit, for example for contactless configuration of the unit by service personnel or for ranging as described in more detail below, then the transmitter may be a transceiver.

In one preferred embodiment the transmission power of the transmitter unit 13 is selected so that the maximum range at which its signals can be received by the information receiver 2 corresponds to the range of utility of the local circumstance that is being indicated by the information provision unit 1. For example, if the information provision unit is indicating a soft drinks vending machine then a typical range of utility may be around 200 m, since few people would walk further than that to buy a soft drink from a vending machine; or if the information provision unit is indicating the end of a platform then the range of utility may be around 3 m since the platform end poses no danger unless it is approached within that range.

Instead of limiting the transmission power to the useful range of the object being signalled, as described above, in another preferred embodiment the information receiver 2 is capable of estimating its distance from the transmitter of an information provision unit from which it is receiving data. This may, for example, be done by measuring at the information receiver the time delays of signals from the transmitter with respect to a master clock known to both the transmitter and the receiver; measuring at the information receiver group delay of signals from the transmitter; probing the link between the transmitter and the receiver by bi-directional communication between them (if the information provision unit and the information receiver are equipped with transceivers); or by the information provision unit transmitting data indicating its location and the information receiver being provided with other means for determining its location (for instance from local cellular telephony base-stations or the Global Positioning System (GPS)) and means for calculating the difference between the two.

If, alternatively, no means were provided for limiting the effective range of the signals from the transmitter then information receivers may easily become overburdened by unmanageable amounts of data from information provision units, including units that are so far away from the user that the data they are providing is of no interest or use to him.

The signals transmitted by the information provision unit preferably accord to a standard format so that they can easily be interpreted by information provision units. It is preferred that the signals repeat the following information:

1. Unique numeric identity of the information provision unit.
2. Type of the information provision unit. This may be a field containing that is directly descriptive of the type of the information provision unit, or a numeric type identifier that corresponds to one type from a predetermined set of types. If a predetermined set of types is used then a description of each of those types is preferably stored at the information receiver 2 to allow a user to select which of those types he requires data from, as described below
3. Status information. Such status information may provide information on the status of the local circumstances of the information provision unit as detected by its status sensor 11.

The numeric identity may be omitted if there is no need for it in a particular system, and the status information may be omitted if the information provision unit has only a single status (e.g. a platform end warning). The type information may be omitted if the system only has a single type of information provision unit; in that case the signal could be of fixed content.

The information receiver 2 comprises a receiver unit 21, a central processing unit 22 and a user interface 23. The information receiver is suitably a portable device that can easily be carried by a person. The information receiver could be integrated with another device such as a portable audio unit, a wrist watch or a cellular telephone. It could share some components (e.g. user interface or receiver unit) with such another device. In this way, the device could provide one function (e.g. playing music over headphones) which could be interrupted or supplemented over the same user interface apparatus (e.g. beeping over headphones) when an alert is called for.

The receiver unit is arranged to receive signals from information provision units 1 and to pass the resulting information to the central processing unit.

The central processing unit may be provided with a temporary random access memory and a non-volatile program memory in the normal way.

The user interface is arranged to provide information to a user in dependence on information received wirelessly from information provision units. This may, for example be by one or more of audible means, such as playing alerting tones or pre-recorded voice messages; visual means, such as flashing an indicator or displaying a stored message on a text display unit of the information receiver; or tactile means such as vibrating. The type of alerting may be preset or selected by the user to depend on the type of information that has been received. In this way the user will know what type of information provision unit he is near. For example, where different types of information provision unit are provided for blind people the alert may let the user know which of a proximity danger, a change of contour, an obstacle or a trip hazard is near.

In operation the information receiver is carried by a user. It continuously (whether uninterruptedly or intermittently) checks for signals from information provision units. If such a signal is received then the information carried by it is passed by the receiver unit to the central processing unit. In accordance with its present configuration the central processing unit may then cause the user interface to alert the user to the information. The user may then take action accordingly.

It is preferred that the user can configure the information receiver to select the data that he is to be alerted of. This may conveniently be done by means of a keypad, touch screen, mechanical knobs etc. of the user interface device. Where the information receiver stores a predetermined set of types together with a description of each of those types, the user may scroll through a display of those types and select the types on which he wishes to receive information; alternatively the desired types by be entered directly. The central processor stores the types on which information is to be received. When information from an information provision unit is received at the central processing unit the central processing unit checks whether the received information indicates that that information provision unit is one of the types on which information is desired. If it is then the user is alerted accordingly and otherwise the information is discarded. The user may also be able to select alerting on the basis of the status information provided by the data transmission units. For example, if the user wants to be alerted when he passes near a vending machine that has a certain brand of soft drink in stock then he may configure the information receiver to filter out information from vending machines that do not have the required drink.

As indicated above, the information receiver may be capable of determining its distance from a data transmission unit. The information receiver may have additional hardware, such as a transceiver instead of a receiver, in order to accomplish this. The information receiver may also be capable of interrogating suitably equipped data transmission units to request additional status information beyond that transmitted in their standard communications. In response to such a request the transmission units return the requested information. This allows the standard communications to be kept short, reducing interference and power usage, with additional information being provided only if required.

Figure 2:
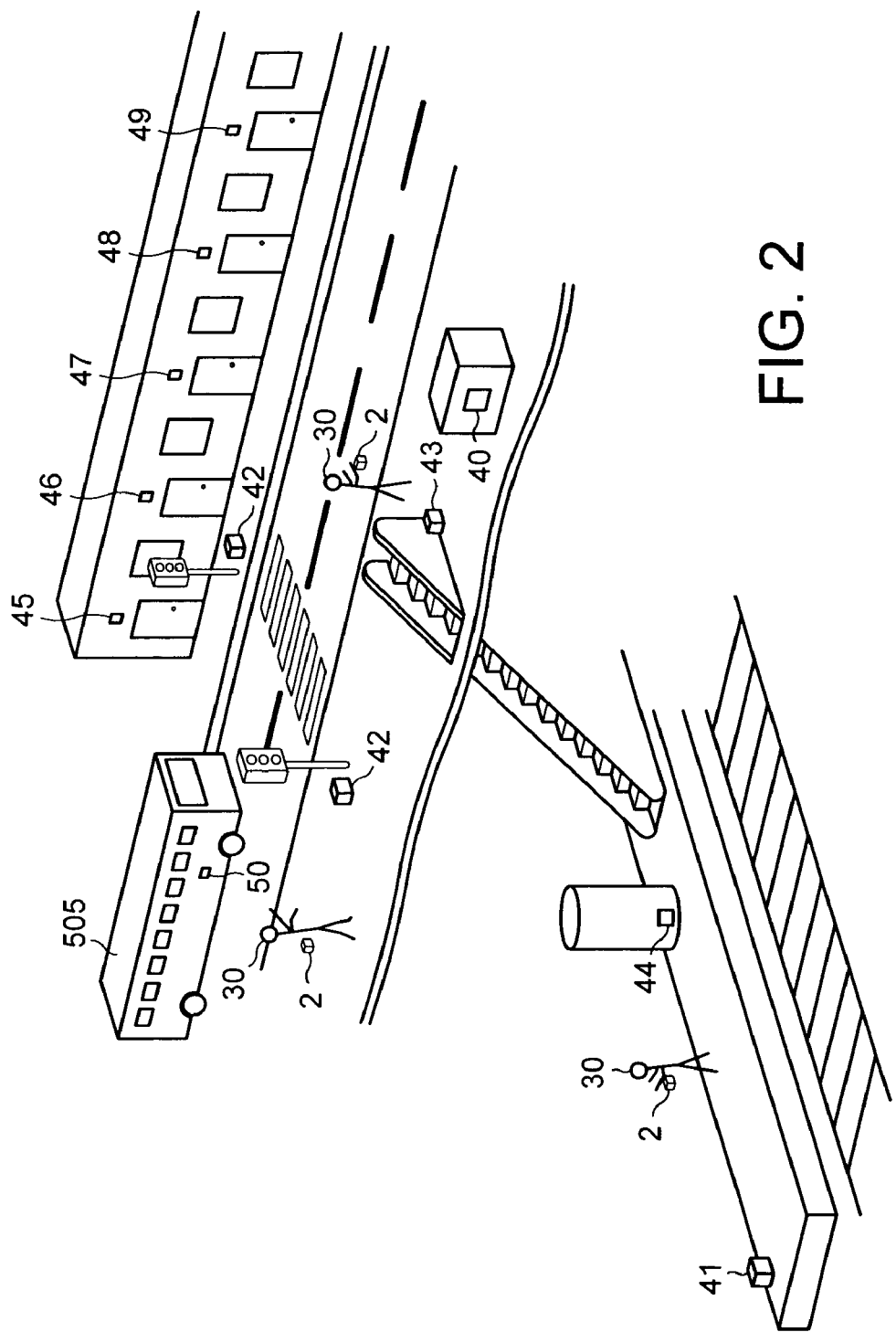
FIG. 2 illustrates the use of the system of FIG. 1 in an urban setting.

Some specific examples of uses of the present system are illustrated in FIG. 2. FIG. 2 shows a typical urban environment including a number of users 30 carrying information receivers 2. A number of information provision units 40–50 are provided at various locations. The information provision units in this example are as follows.

Unit 40 is located at a vending machine. It senses the status of the vending machine, including the availability of various items for purchase and repeatedly transmits that information over a range of around 200 m together with an indication that the unit 40 is of a type 1 (i.e. a vending machine type).

Unit 41 is located at the end of a station platform. It repeatedly transmits a signal including its type 2 (i.e. proximity danger) over a range of around 3 m to allow blind people to be alerted to the danger.

Unit 42 is located at a pedestrian crossing. It senses the status of the pedestrian crossing and repeatedly transmits that information over a range of around 50 m to allow blind people nearby to be alerted to the presence and status of the crossing. The signal transmitted by unit 42 includes an indication that it is of type 3 (i.e. pedestrian crossing).

Unit 43 is located at the top of an escalator. It repeatedly transmits a signal including its type 4 (i.e. contour change) over a range of around 3 m to allow blind people to be alerted to the potential hazard.

Unit 44 is located at a pillar. It repeatedly transmits a signal including its type 5 (i.e. obstacle) over a range of around 3 m to allow blind people to be alerted to the potential hazard.

Unit 45 is located at the entrance to a newsagents shop. It repeatedly transmits a signal over a range of around 400 m. The type of the signal is 6 (i.e. newsagents shop). If a user 30 wants to buy a newspaper he can set his information receiver to alert him when a type 6 signal is received. Thus he may be alerted when he passes near a newsagents shop. Analogous units 46 to 49 are provided at other shops, and transmit other type information.

Unit 50 is located on a bus 505. It repeatedly transmits a signal over a range of around 1000 m. The type of the signal is 7 (i.e. 505 bus). If a user 30 wishes to catch a 505 bus he can set his information receiver to alert him when a type 7 signal is received. Thus he may be alerted when a 505 bus approaches.

The information receiver may be capable of making a payment by means of a credit card function. For example, the information receiver may be capable of automatically transmitting a user's credit card or other payment specification information to a receiver. This may allow the user to conveniently pay for products or services from a shop or vending machine, by transmission of the payment specification information from the information receiver (including a transceiver) to a payment accepting unit. The payment accepting unit could be integrated with the information provision unit.

In one example of a preferred implementation of the invention a user may decide that he wishes to purchase a certain soft drink from a vending machine. He configures his information receiver to alert him when information is received from a vending machine that has the soft drink available. When he is alerted that such a vending machine is nearby he approaches the vending machine and initiates a purchase transaction. He causes his information receiver to transmit his payment information to the information provision unit of the vending machine which causes a transaction to be performed, to transfer the cost of the drink from the user's account as specified by the information receiver to the account of the operator of the vending machine. If the transaction is successful the vending machine dispenses the drink. The user then resets his information receiver so as not to receive further information on vending machines selling the soft drink.

The present invention may include any feature or combination of features disclosed herein either implicitly or explicitly or any generalisation thereof, irrespective of whether it relates to the presently claimed invention. In view of the foregoing description it will be evident to a person skilled in the art that various modifications may be made within the scope of the invention.

The invention claimed is:

1. A local data provision system comprising:
   a plurality of transmitters each located at a respective entity having a limited range of physical utility, and each transmitter being arranged repeatedly or on demand to transmit wirelessly a signal carrying data indicating the presence of the respective entity over a range substantially coterminous with the range of utility of that entity;
   a personal information unit comprising a user interface for signaling information to a user and a receiver arranged to receive the entity presence data and to cause the user interface to signal information to the user in dependence on the received entity presence data; and at least one status sensor located at one of the entities and capable of sensing the status of the entity and causing the respective transmitter to transmit wirelessly a signal carrying data indicating the status of the respective entity; wherein the signal carrying data indicating the presence of a respective entity includes data indicating the type of the entity; and the personal information unit includes a memory capable of storing a plurality of entity types and the personal information unit is arranged to cause the user interface to signal information to the user only if the received entity presence data includes data indicating one of the stored types.

2. A local data provision system comprising:

a plurality of transmitters each located at a respective entity having a limited range of physical utility, and each transmitter being arranged repeatedly or on demand to transmit wirelessly a signal carrying data indicating the presence of the respective entity over a range substantially coterminous with the range of utility of that entity; and a personal information unit comprising a user interface for signaling information to a user and a receiver arranged to receive the entity presence data and to cause the user interface to signal information to the user in dependence on the received entity presence data; wherein the signal carrying data indicating the presence of a respective entity includes data indicating the type of the entity;

the personal information unit includes a memory capable of storing a plurality of entity types and the personal information unit is arranged to cause the user interface to signal information to the user only if the received entity presence data includes data indicating one of the stored types; and the personal information unit includes input means for allowing a user to specify the plurality of entity types that are to be stored.

3. A local data provision system as claimed in claim 2, wherein the signal is a radio signal.

4. A local data provision system as claimed in claim 2, wherein the personal information unit is a cellular telephone.

5. A local data provision system as claimed in claim 2, wherein the personal information unit is a portable unit.

6. A local data provision system comprising:

a plurality of transmitters each located at a respective entity having a limited range of physical utility, and each transmitter being arranged repeatedly or on demand to transmit wirelessly a signal carrying data indicating the presence of the respective entity over a range substantially coterminous with the range of utility of that entity;

a personal information unit comprising a user interface for signaling information to a user and a receiver arranged to receive the entity presence data and to cause the user interface to signal information to the user in dependence on the received entity presence data; wherein the signal carrying data indicating the presence of a respective entity includes data indicating the type of the entity;

the personal information unit includes a memory capable of storing a plurality of entity types and the personal information unit is arranged to cause the user interface to signal information to the user only if the received entity presence data includes data indicating one of the stored types: and the personal information unit is capable of non-visually alerting a user in dependence on the received entity presence data.

7. A local data provision system comprising:

a plurality of transmitters each located at a respective entity having a limited range of physical utility, and each transmitter being arranged repeatedly or on demand to transmit wirelessly a signal carrying data indicating the presence of the respective entity over a range substantially coterminous with the range of utility of that entity; and a personal information unit comprising a user interface for signaling information to a user and a receiver arranged to receive the entity presence data and to cause the user interface to signal information to the user in dependence on the received entity presence data; wherein the signal carrying data indicating the presence of a respective entity includes data indicating the type of the entity;

the personal information unit includes a memory capable of storing a plurality of entity types and the personal information unit is arranged to cause the user interface to signal information to the user only if the received entity presence data includes data indicating one of the stored types; and the personal information unit is capable of alerting a user with one of a plurality of alerts in dependence on the type indicated by received entity presence data.

* * * * *